Patented Oct. 9, 1945

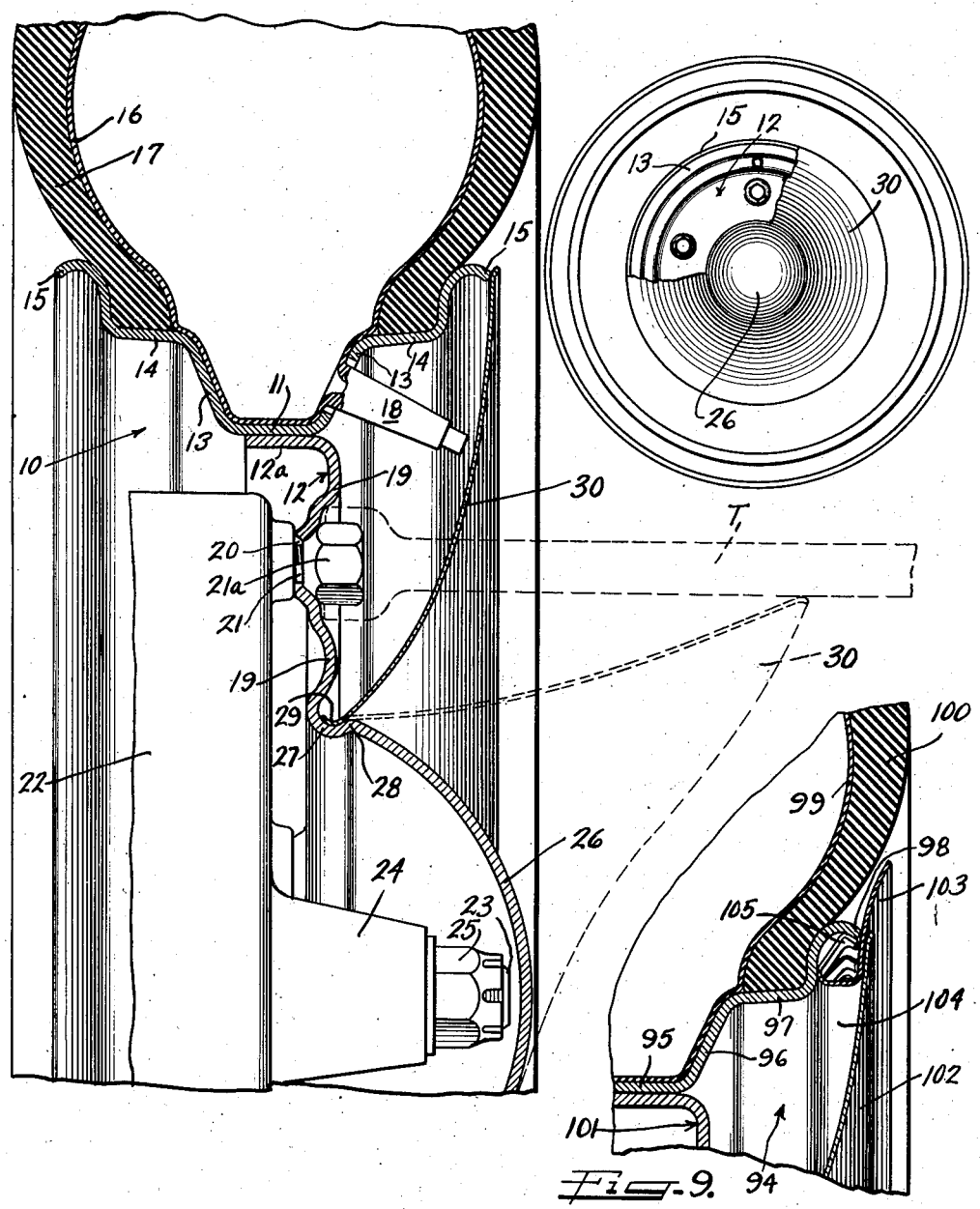

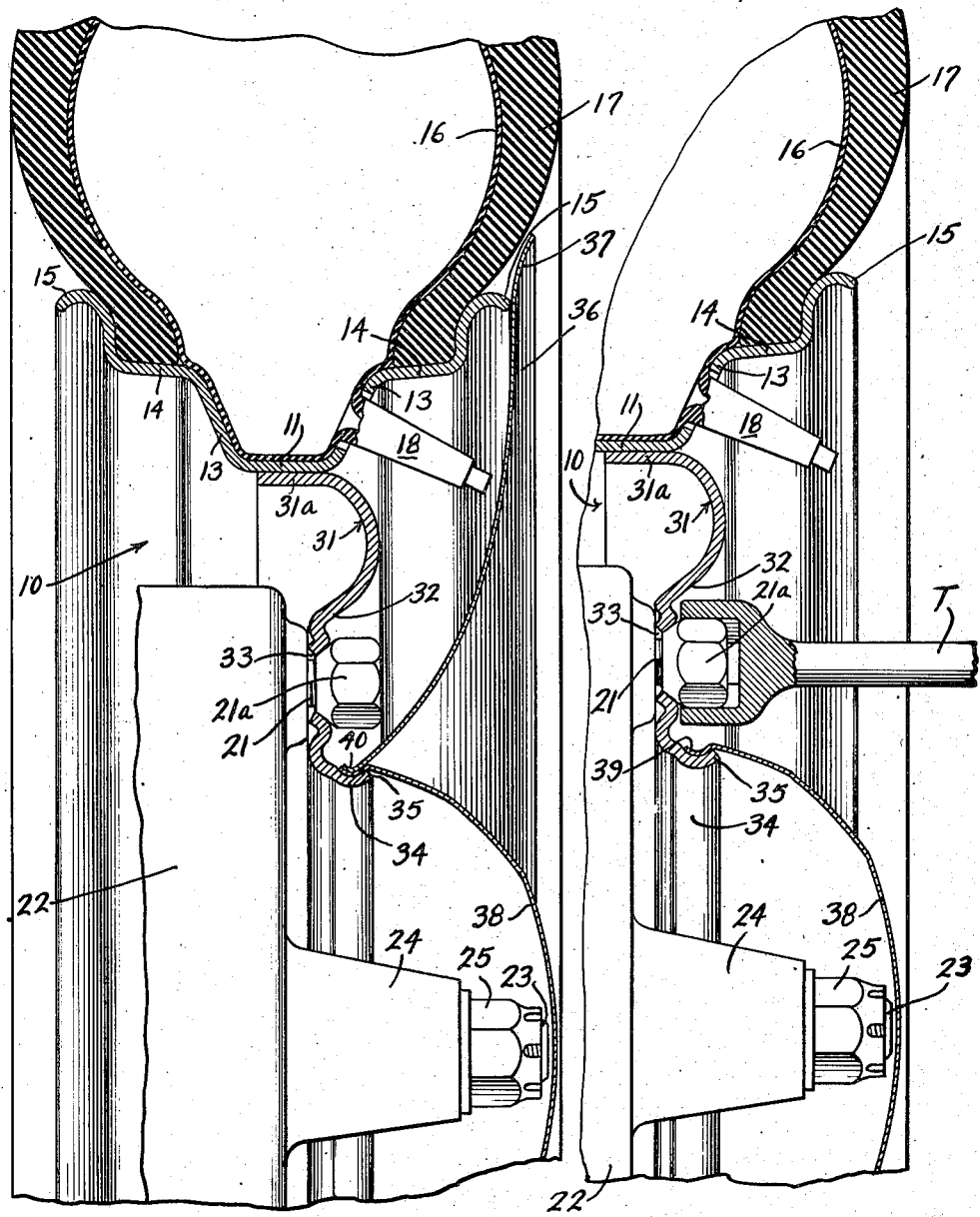

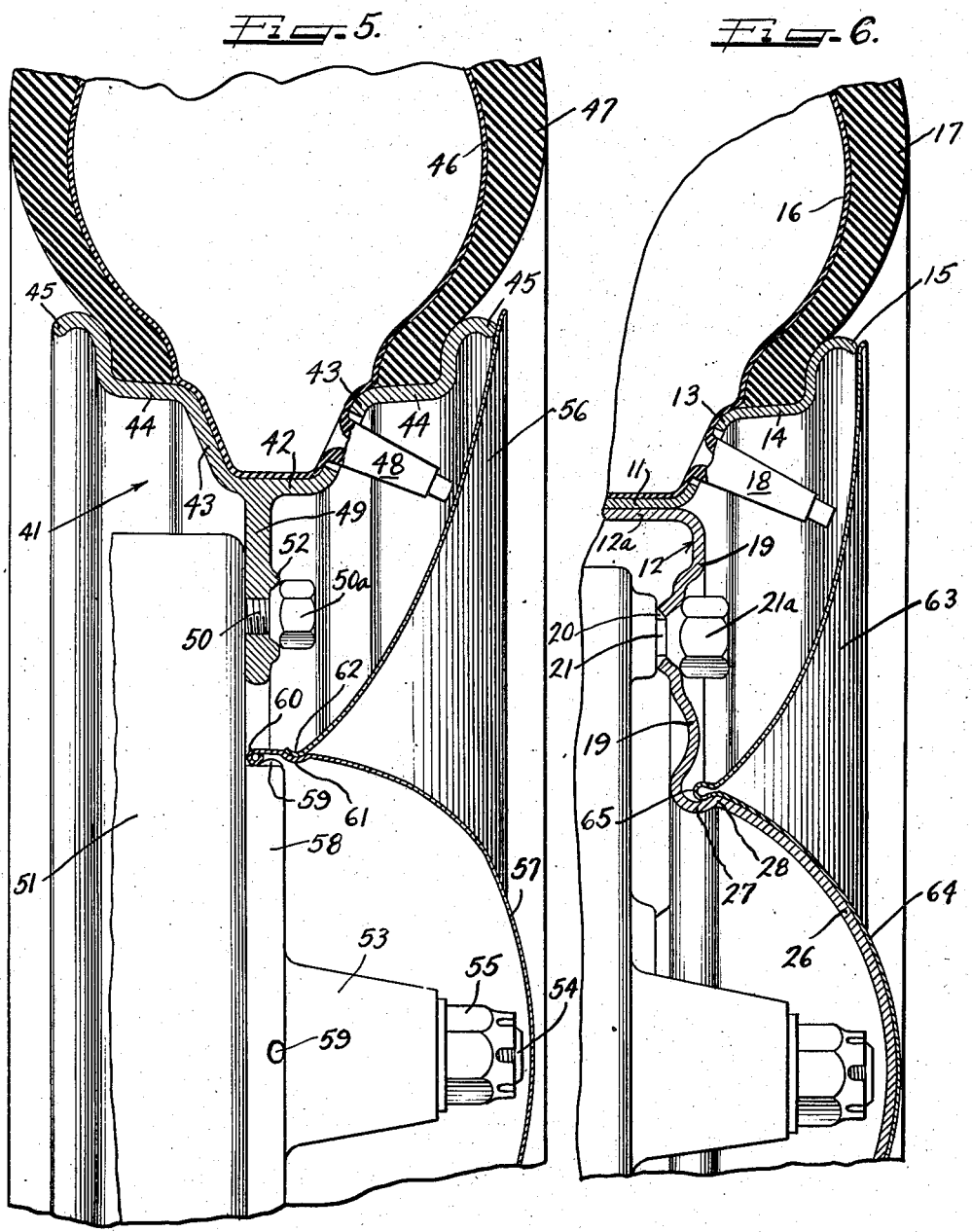

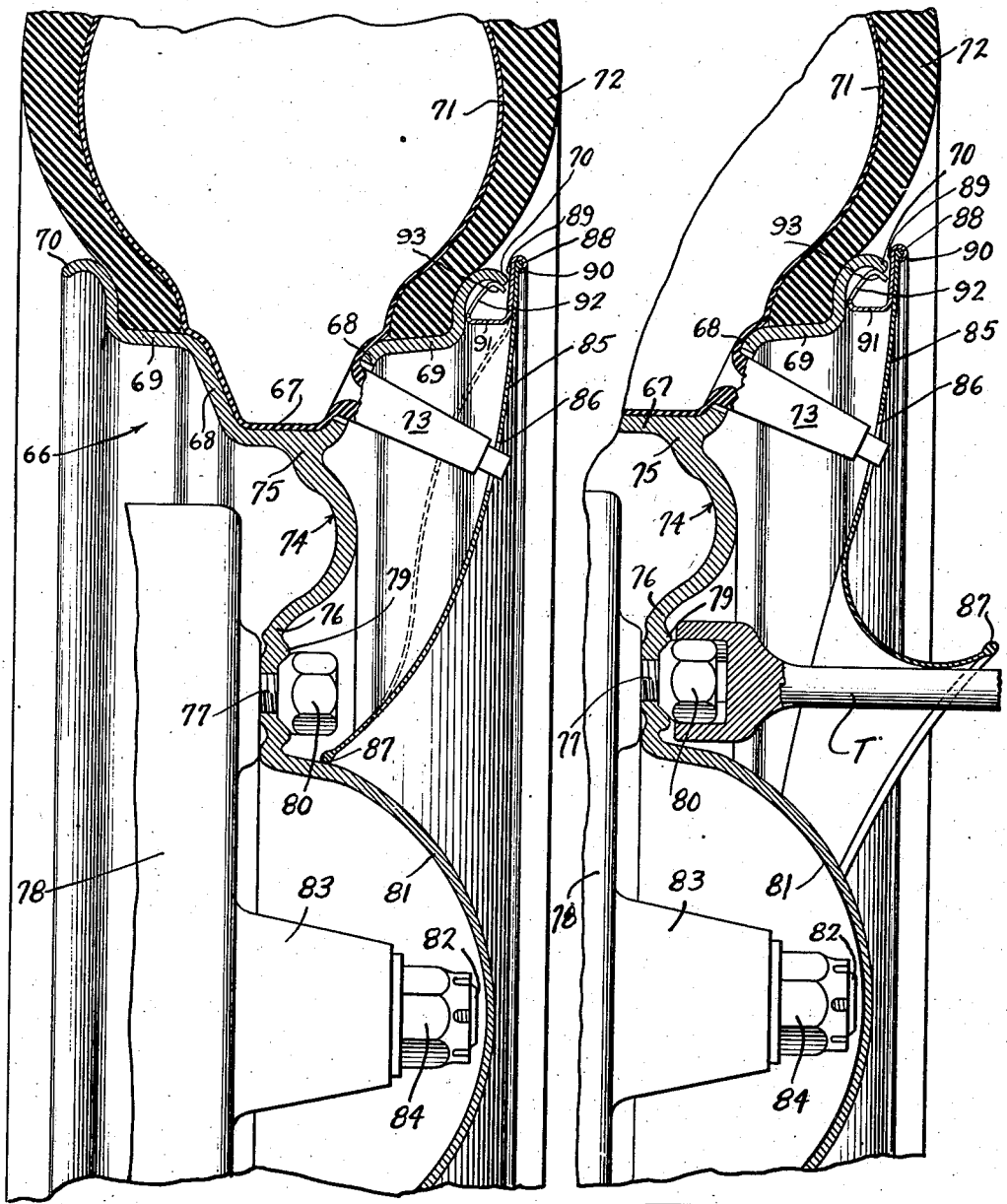

2,386,245

UNITED STATES PATENT OFFICE 2,386,245

WHEEL STRUCTURE

George Albert Lyon, Allenhurst, N. J.

Application April 10, 1944, Serial No. 530,351

14 Claims. (Cl. 301—37)

This invention is directed to an improved wheel structure and to an improved cover assembly therefor.

It is an important object of the present invention to provide an improved wheel structure for a vehicle, this wheel structure including a solid, central load bearing portion having a solid central wheel spindle covering part which may serve in itself as a hub cap and having a radially outer part provided with bolt apertures to receive bolts, whereby the wheel may be secured to a brake drum of the vehicle, this part of the load bearing portion of the wheel being arranged to be concealed by an improved wheel cover assembly.

It is another object of the present invention to provide for a vehicle wheel, an improved cover assembly including an annular flexible cover part arranged to extend over and conceal the wheel bolts, this cover part being constructed from sheet synthetic plastic material whereby it is self-sustaining as to form and yet may be temporarily, locally distorted to permit access to the rear thereof and to the wheel bolts for removal of the same, and whereby, when manual distorting pressures are relieved therefrom, it will immediately snap back into its initial configuration, this configuration preferably being such that when extended to the edge portion of a tire rim on the wheel, the cover will give the appearance of being a continuation of the side wall of a tire thereon and furthermore will appear as the white side wall of the tire, if colored white.

It is another object of the present invention to provide a wheel and cover assembly which is so arranged that the wheel may be removed in its entirety from the vehicle without first removing the cover assembly therefrom, even though this cover assembly is arranged to entirely conceal the attachment means by virtue of which the wheel is secured to the vehicle.

It is still a further object of the present invention to provide a solid disk wheel having an integral central spindle concealing, hub cap simulating part, and having a radially outer part for receiving bolts for attaching the wheel to the brake drum.

It is another object of the present invention to provide a solid disk wheel having an integral portion for concealing the spindle of a vehicle and for serving as a hub cap together with a resiliently flexible, annular cover of less durable and different material than the wheel arranged to bridge the central hub cap portion of the wheel and the radially outer extremity thereof to conceal attachment means whereby the wheel is secured to a brake drum or the like of a vehicle, this annular cover being retained upon the wheel by attachment of either the outer or inner edges thereof to the wheel.

It is still a further object of the present invention to provide for a vehicle wheel having a tire rim and a central load bearing portion, an improved cover assembly including a radially outer annular cover member arranged to extend over the outer side of the tire rim, this cover member preferably being of less durable and different material than said wheel and rim and extending up to an edge portion of the tire rim, the cover being completed by the provision of a relatively rigid cover element having a radially outwardly extending flange for extending outwardly beyond the edge portion of the tire rim to conceal the gap between the edge portion and a tire in the rim and also having at the radially inner part thereof resilient fingers bent back to extend obliquely axially, radially outwardly to retainingly engage the edge portion of the rim to maintain said last named cover part thereon, the radially outwardly extending flange further serving to protect the edge of the less durable and deflectable cover from breakage during use.

In accordance with the general features of the present invention there is provided herein an improved wheel structure of the drop center rim type having a central load bearing portion secured to the rim by attachment of the outer peripheral part thereof to the base flange of the rim. The central load bearing portion is of a solid disk type and is provided at the radially outer part thereof with bolt apertures adapted to receive bolts extending from a portion of the vehicle such as a brake drum or the like, whereby the wheel may be attached to the vehicle and is formed at the central part thereof with a circular protuberance arranged to house the wheel spindle and to simulate a hub cap, there being means on the wheel for retainingly receiving a marginal edge of a resiliently, locally flexible annular cover arranged to extend over and conceal that portion of the wheel through which the bolts extend, the cover being formed to be manually, flexibly manipulated to render the bolts accessible so that they may be loosened and the wheel removed from the vehicle without necessitating the removal of the cover.

In accordance with the general features of another embodiment of the invention there is provided herein a wheel of the drop center rim type having a central load bearing portion provided, at a radially outer part thereof, with apertures for receiving wheel bolts by means of which the wheel may be secured to the brake drum or the like of a vehicle, the wheel being further provided with attachment means for receiving a marginal edge of a circular, flexible cover made from synthetic sheet plastic or the like which is arranged to bridge the portion of the wheel including the bolts to conceal the same and generally augment the appearance of the vehicle, this cover being arranged to be flexed axially outwardly to permit the disposal of a bolt loosening tool therebehind to facilitate the removal of the wheel from the vehicle without removal of the cover therefrom.

It is another object of the invention to provide a vehicle construction including means for detachably receiving a cover assembly and means for detachably receiving a wheel.

A further object of the present invention is to provide an improved construction wherein the wheel is provided with a central load bearing portion or spider having means at substantially the radially outer part thereof for attachment to a vehicle, there being also provided an improved cover assembly for concealing the bolt-on portion of the spider yet whereby the wheel may be removed from the vehicle without detaching the cover.

Many other objects and advantages of the invention will become apparent from the following description and accompanying drawings in which:

Figure 1 is a side elevational view with parts broken away for illustrative purposes of a wheel construction embodying one form of my invention;

Figure 2 is a fragmentary, enlarged cross-sectional view of a wheel structure embodying the form of my invention shown in Figure 1;

Figure 3 is a fragmentary, cross-sectional view of a wheel structure embodying still another form of my invention;

Figure 4 is a view similar to Figure 3 showing the procedure in removing the wheel of Figure 3 from the vehicle;

Figure 5 is an enlarged, fragmentary cross-sectional view of another form of wheel structure and cover assembly embodying my invention;

Figure 6 is a fragmentary, enlarged cross-sectional view of a wheel structure similar to that shown in Figure 3 with a modified form of cover associated therewith;

Figure 7 is an enlarged, fragmentary cross-sectional view of still another wheel structure embodying my invention;

Figure 8 is a view similar to Figure 7 showing the manipulation of the cover in removing the wheel of Figure 7 from the vehicle; and Figure 9 is a fragmentary cross-sectional view of a modified form of my invention showing still another manner of cover arrangement.

It will be understood that the embodiments shown herein are for illustrative purposes only and may be changed or modified without departing from the spirit and scope of the invention as set forth in the appended claims.

Referring first to Figure 2 the wheel shown therein includes a drop center type tire rim 10 having a base flange 11 and a central load bearing portion 12 provided with a generally axially inwardly extending peripheral flange 12a which may be secured to the base flange 11 in any suitable manner as by welding or riveting or the like.

The drop center rim 10 is further provided with opposite side wall flanges 13, opposite intermediate flanges 14 and opposite edge portions 15 between which may be disposed a pneumatic tire having an inner tube 16 and a casing 17, the inner tube 16 being provided with a valve stem 18 which extends through a suitable aligned aperture in the respective side wall flange 13 of the tire rim.

It has been customary in the past, in constructing wheel structures, to so arrange these structures that the bolt-on flange was disposed considerably toward the center of the wheel that the bolts used in attaching the wheel to the vehicle could be concealed by a hub cap simulating cover member which was circular and centrally disposed of the wheel. With such a construction it was necessary that the hub cap be a separate part of the wheel and detachably secured thereto to permit removal to obtain access to the wheel bolts and furthermore, such access was not obtainable without the added manipulation of removing the hub cap simulating cover member. Under such circumstances the hub cap was often lost and in many cases became damaged while removed from the wheel. Furthermore, because of its removable connection with the wheel, such a hub cap simulating cover member was often lost during operation of the vehicle without the knowledge of the operator.

To the end that the above difficulties may be avoided by the utilization of a spindle cover which is integral with the wheel and to the end that the wheel may be removed from the vehicle without requiring separation of the cover therefrom preliminary to the removal operation, the central load bearing portion 12 in the construction of Figure 2 is provided at the radially outer part thereof with a bolt-on flange 19 provided with apertures 20 which are circularly arranged and circumferentially spaced from one another to be aligned with bolts 21 extending from the brake drum 22 of the vehicle. The brake drum 22 is mounted upon the wheel spindle 23 which extends through a boss 24 formed integrally with the drum. This relationship is maintained by a castellated nut 25.

To the end that the end of the spindle 23 may be concealed and the wheel may be given a neat, attractive appearance without necessitating an auxiliary, central cover member, the central load bearing portion 12 and particularly the bolt-on flange 19 at the radially outer part thereof extends radially inwardly to form an integral, solid center part 26. This central part 26 is provided with an axially outwardly convex configuration so as to house the outer end of the spindle 23 and so as to impart to the finished wheel a neat and attractive appearance.

The junction of the radially outer part of the bolt-on flange 19 and the central portion 26 of the load bearing wheel part 12 is cross-sectionally configurated to provide a rigidifying bead part 27 which extends generally axially inwardly of the wheel to afford on the outer side thereof a generally axially inwardly, radially inwardly opening groove defined on the outer side by a shouldered portion 28. This groove together with the circular shoulder 28 is arranged to receive the radially inner marginal part 29 of a cover 30 which is provided with a central aperture having a dimension slightly smaller than the shoulder 28. The annular cover member 30 is preferably formed from sheet synthetic plastic or other material whereby it may be locally, temporarily, resiliently distorted and yet will immediately snap back to initial configuration when distorting pressure is relieved therefrom. The cover 30 is also provided with a cross-sectional expanse and configuration whereby it extends from the shoulder 28 at a radially inner part of the wheel, radially outwardly to the vicinity of the edge portion 15 of the tire rim 10, thereby to bridge over and conceal the radially outer part of the wheel, particularly the bolts 21 and the nuts 21a, by which the wheel is attached to the brake drum 22 and also the junction between the central load bearing portion 12 and the tire rim 10 and the tire valve stem 18. Furthermore, the cover member 30 is provided with a cross-sectional configuration whereby it gives the effect of being a continuation of the side wall of the tire 17 and gives the appearance of being a white side wall of a massive tire mounted on a wheel structure of minimum dimensions, when colored white.

As will best be seen from Figure 1, when the wheel and cover assembly is assembled as shown, the entire radially outer portion of the wheel is concealed by the cover member 30 so that the axially outer appearance of the wheel structure includes only this cover member together with the central convex portion 26 of the wheel. This is found to provide an extremely attractive and neat appearance and, as will be seen, this appearance is accomplished with the use of a single auxiliary cover member.

In removing the wheel from the vehicle it is highly desirable that this be accomplished without necessitating the complete removal of any auxiliary cover members whereby they may become damaged or lost while detached from the wheel. Accordingly, as shown in Figure 2, it will be seen that in order to remove the wheel from the brake drum and thus from the vehicle it is merely necessary for the operator to flex the cover 30 axially outwardly and radially inwardly from the outer edge thereof as shown in dotted lines, whereupon a tool T may be inserted therebehind into engagement with the nuts 21a. The tool is then rotated and the nuts 21a removed from the respective bolts 21 and the wheel assembly, cover assembly and the tire may then be shifted axially outwardly from the vehicle and removed therefrom as a unit.

Another attribute of the construction of Figure 2 resides in the fact that the central hub cap simulating portion of the wheel 26 is constructed from heavy metal and is provided with a configuration deep enough so that should the wheel come to rest on a hard surface with the axially outer part thereof facing downwardly, the weight of the wheel will be borne by the central portion 26 and the intermediate, less durable cover 30 will be completely protected against damage. It will be understood also that during operation of the vehicle the protruding central, strong hub cap portion 26 of the wheel serves to protect the flexible and less durable cover 30 from coming into lateral contact with curbing or the like against which the vehicle may be driven accidentally.

In the construction of Figure 3 the wheel includes a rim of the drop center type identical to that shown in Figure 2 together with a brake drum and spindle arrangement which is likewise similar to that shown in Figure 2.

This construction differs from that of Figure 2 primarily in the details of the central load bearing 31 which is provided at the radially outer part thereof with a generally axially inwardly extending flange 31a which may be secured to the base flange 11 of the rim in any suitable manner as by welding or riveting or the like.

The radially inner part 32 of the central load bearing portion 31 is provided with bolt apertures 33 which are circularly aligned and circumferentially spaced to coincide with a wheel bolt 21 extending from the brake drum 22. It will be seen that when the wheel is, as in the case of the construction in Figure 2, placed on the brake drum so that the bolts 21 extend through the apertures 33 and the nuts 21a are screwed onto the bolts, the wheel is securely attached to the vehicle. The extreme radially inner portion of the bolt-on flange 31 terminates circularly in a generally axially outwardly extending lip 34 which has a radially outwardly turned peripheral portion 35 that functions to maintain a cover on the wheel as does the shoulder 28 in the construction of Figure 2. It will be seen that this shoulder 35 serves as the axially outer limit of a radially outwardly facing groove in the lip 34.

The cover construction of Figure 3 includes a radially outer annular plastic cover member 36 which may extend radially outwardly beyond the edge portion 15 of the tire rim as at 37 and a central circular hub cap simulating cover 38 which may also, if desired, be formed from resilient plastic material. The radially outer margin of the dished central hub cap simulating cover member 38 is formed to provide a circular, radially inwardly protruding bead portion 39 as shown best in Figure 4. This beaded portion 39 is arranged to be disposed elastically behind the shoulder 35 and into the groove of the lip 34 defined thereby. The plastic cover member 36 which is in the form of an annulus is likewise provided at its radially inner margin with a circular, conforming beaded portion 40 which is arranged to nest within the bead 39 of the cover member 38 when the bead 39 is in turn nested in the groove of the lip 34 of the wheel part. Thus it will be seen that in this construction the wheel bolts are likewise disposed radially outwardly of the confines of the central cover member 38 and are concealed behind the plastic cover member 36 which, as in the case of the construction of Figure 2, may be flexed radially inwardly and axially outwardly to permit insertion of a pry-off tool T or, as shown in Figure 4, may be removed entirely before the wheel removal operation takes place. In this event it will be seen that removal of the cover member 36 does not necessitate removal of the central cover member 38.

In the construction of Figure 5 there is provided an improved vehicle wheel of the drop center type which is susceptible of manufacture by a casting operation. In this construction there is provided a drop center type tire rim 41 having a base flange 42, opposite side wall flanges 43, opposite intermediate flanges 44 and opposite edge portions 45 between which may be disposed a pneumatic tire having an inner tube 46 and a casing 47, the inner tube being provided with a valve stem 48 which extends through a suitable aperture formed in the adjacent side wall flange 43.

Formed integrally on the radially inner surface of the base flange 42 of the tire rim 41 is a cast bolt-on flange 49 provided at a radially inner part thereof with bolt apertures adapted to receive bolts 50 extending from the brake drum 51 of the vehicle. The bolt-on flange 49 is provided at the axially outer side thereof with bosses 52, each of which defines a respective bolt aperture, thereby to receive the usual bevel on the respective nut 50a for properly aligning the wheel on the brake drum 51 with precision.

The brake drum 51 is further provided with a spindle boss 53 adapted to receive a wheel spindle 54 upon which is mounted a castellated nut 55 to maintain the structure together.

To the end that a cover assembly including an outer annular plastic trim ring 56 and a central circular hub cap simulating plastic trim ring 57 may be detachably mounted upon the vehicle, the brake drum 51 is provided with a circular, axially outwardly extending boss 58 provided at the radially outer edge thereof with a plurality of circumferentially spaced protuberances 59. As will be seen from Figure 5 these protuberances 59 are disposed at the axially outer part of the boss 58 thereby to provide a space therebehind for receiving the cover in a manner to be described presently.

The central circular cover member 57 is provided at the radially outer edge thereof with a radially inwardly rolled bead 60 defining a circle slightly smaller than the circle defined by the radially outer extremities of the protuberances 59. Thus it will be seen that when the cover member 57 is aligned with the boss 58 and pressed axially inwardly on the wheel it will be distorted from its circular formation temporarily until the bead 60 comes to rest behind the respective humps 59. Preferably the bead 60 is provided with an axial expanse large enough so that when it is wedged against the axially inner side of the respective humps 59 it will also engage the adjacent surface of the brake drum 51 to be held on the wheel against axial shifting and vibration.

To the end that the annular cover member 56 may be retainingly engaged with the wheel structure, the central circular hub cap simulating cover member 57 is provided with a circular, radially inwardly ridged portion 61 which affords a radially outwardly opening groove adapted to retainingly receive in elastic snap-on relationship, the radially inner margin 62 of the cover member 56 which is curled axially inwardly and slightly radially outwardly to nest within the groove formed by the portion 61.

After the structure shown in Figure 5 has been assembled the bolts 50a by means of which the wheel may be removed from the brake drum are rendered accessible in a manner described in conjunction with the structure of Figures 2 and 3. In other words, the cover member 56 may be flexed outwardly as shown in dotted lines in Figure 2 or may be entirely removed from the cover member 57 in the manner shown in Figure 4.

In the construction shown in Figure 6 the wheel structure is identical to that shown in Figure 2 and like parts are similarly identified.

In this construction the cover assembly differs somewhat from that shown in Figure 2. This difference resides principally in the fact that the cover includes a radially outer portion 63 and a central circular hub cap portion 64 arranged to overlie and ornament the central circular convex portion 26 of the central load bearing wheel part 12.

The cover parts 63 and 64 as will be seen, are formed integrally with one another and the junction thereof comprises a generally axially inwardly extending circular beaded part 65 which is arranged to be elastically snapped over the shoulder 28 of the wheel part 12 and to retainingly nest in the groove formed by the beaded portion 27 of the wheel. If desired, a split circular wire or ring may be snapped into the interial of the bead portion 65 of the cover after it is mounted as shown in Figure 6 to augment the retention thereof upon the wheel by holding the bead 65 tightly in its nested relationship.

Here again, the bolts 21a may be rendered accessible by flexure of the cover portion 63 from the radially outer edge thereof, or, if desired, the entire cover assembly may be removed from the wheel by withdrawal of the bead 65 axially outwardly over the shoulder 28.

The wheel construction shown in Figures 7 and 8 is somewhat similar to that shown in Figure 5 in that the bolt-on flange is formed integrally with the tire rim and the wheel is susceptible of being manufactured by a casting process.

In this construction the tire rim 66 includes a base flange 67, opposite side wall flanges 68, opposite intermediate flanges 69 and opposite edge portions 70, between which may be disposed a pneumatic tire including an inner tube 71 and a casing 72, the inner tube having an elongated valve stem 73 extending through a suitable aperture in the adjacent side wall flange 68.

The central load bearing portion 74 is joined integrally with the base flange 67 by a somewhat thickened or enlarged section 75 and is provided at an intermediate part thereof with a bolt-on flange portion 76 having apertures formed therein for receiving bolts 77 extending from a brake drum 78 of the vehicle. The outer surface of the bolt-on flange 68 is provided with a plurality of circular bosses 79, each of which defines one of the bolt apertures and serves to receive a beveled portion of a respective nut 80 for aligning the wheel on the brake drum with precision when the nuts 80 are screwed onto the bolts 77. The circular bolt-on flange 76 of the wheel serves as the radially outer extremity of a central, integral, circular hub cap simulating wheel section 81 which is, as in the case of the construction of Figure 2, provided with axially outer convexity to house and conceal the wheel spindle 82 to which the spindle boss 83 of the brake drum 78 is secured by means of nut 84.

In this construction the cover assembly comprises an annular, plastic cover member 85 having the attributes of the covers previously described. The cover 85 is provided with an aperture 86 which is arranged to be aligned with the valve stem 73 so that the end thereof may protrude through the aperture when the cover is applied to the wheel. There is provided at the radially inner and outer edges of the annular cover 85 edge beads 87 and 88 respectively, these beads serving to strengthen the edges against splitting and the bead 88 aiding in the attachment of the cover to the wheel in a manner to be described presently.

It will be seen that in this construction also, the cover 85 is of such radial expanse that it extends from the edge portion 70 of the tire rim 66 radially inwardly to a point on the convex hub cap simulating wheel part 81, thereby to extend over and conceal the entire radially outer part of the wheel together with the attachment bolts and nuts 77 and 80 respectively.

To the end that the radially inner margin of the cover 85 may be free for manipulation to render the rear side thereof and the bolts 77 and nuts 80 available, attachment thereof to the wheel structure is accomplished by means of the radially outer edge thereof. As will be seen in Figures 7 and 8, there is provided at the radially outer part of the annular cover member an attachment annulus having a radially outwardly extending flange 89 terminating in a rolled or beaded portion 90 which envelopes the bead 88 of the cover in permanent engagement therewith. The flange 89 extends radially inwardly along the outer margin of the cover and terminates in an axially inwardly extending annular flange 91, this flange in turn terminating in bent back resilient fingers 92 which are provided with cam fingers 93. The circumferential dimension of the resilient members 92 and 93 is such that when the cover is aligned concentrically with the wheel and forces axially inwardly thereof, the members 92 cam along the edge of the edge portion 70 to be sprung radially inwardly until the fingers 93 are aligned axially with the curled part of the edge portion 70 whereupon they snap outwardly to obtain the retained engagement shown in the drawings. This construction is highly desirable since it provides at the outer edge of the cover 85 a easy-on, hard-off attached relationship.

When the cover is secured to the wheel as described above, it will be seen that the axial outer appearance thereof comprises the central wheel part 81 afforded by the broad curved expanse of the cover member 85 which gives the appearance of a continuation of the side wall of the tire 72. Furthermore, the beaded portion 90 of the cover attachment annulus, being constructed from a more rigid material such as metal admirably protects the outer edge of the cover 85 against damage during operation of the wheel.

When it is desired to attach the nozzle of an air hose to the valve stem 73 it is merely necessary to flex the resilient cover inwardly as shown in dotted lines in Figure 7, whereby the stem 73 protrudes beyond the cover to permit the attachment of the air hose. If it is found necessary to remove the wheel from the vehicle by manipulation of the nuts 80 it will be seen from Figure 8 that the operator need manually grasp the radially inner margin of the cover and draw the same resiliently elastically outwardly to the position shown in Figure 8, whereupon a pry-off tool T may be inserted therebehind to engage the nuts 80.

From the foregoing it will be seen that there is provided herein an extremely rugged wheel structure, the construction of which obviates the necessity of a plurality of cover members in order to obtain the desired effect of a multi-part cover assembly. Furthermore, a high degree of protection is afforded the resilient and less durable plastic cover member 85 by virtue of the associated annular retaining means and particularly the bead 90 and the central protruding hub cap simulating portion 81 of the wheel. It will be seen also that in removing the wheel from the vehicle it is not necessary for the operator to entirely detach the cover 85. As in the other constructions described heretofore it will be seen also that the construction of Figures 7 and 8 is characterized by the provision of a bolt-on arrangement which is disposed radially outwardly of the central hub cap simulating portion of the wheel, whereby the latter may be made integral and thus exceedingly strong since the wheel may be removed from the vehicle without requiring removal of the central hub cap simulating part of the cover.

There is disclosed in Figure 9 another construction which may be utilized to protect the edge of a plastic circular cover and also which is adapted to conceal the junction between the tire rim and the tire therein.

In this construction the wheel includes a rim 94 having a base flange 95, opposite side wall flanges 96, opposite intermediate flanges 97 and opopsite edge portions 98 between which may be disposed a tire having an inner tube 99 and a casing 100. As in the previous constructions there is also provided a central load bearing portion 101 which may be secured to the base flange 95 of the tire rim 94 in any suitable manner such as by welding or riveting or the like. The cover assembly includes a plastic cover member 102 having a radially outer edge which extends substantially to the edge portion 98 but not therebeyond. In order that the junction between the edge portion 98 and the tire 100 may be concealed, there is also provided an annular, relatively rigid member formed preferably from sheet metal or the like and having a radially outwardly extending, slightly axially outwardly flared flange part 103 terminating radially inwardly in a generally axially inwardly extending flange 104, the flange 104 in turn terminating in resilient fingers 105 similar to those shown in the retaining annulus of the construction of Figures 7 and 8. With this construction it will be seen that the radially outwardly protruding more rigid flange 103 serves admirably to protect the edge of the resilient and less durable cover member 102 from splitting during use of the wheel and furthermore the gap between the edge portion 98 of the tire rim and the tire itself is effectively bridged to augment the appearance of the wheel assembly. It will be understood, of course, that in utilizing the construction of Figure 9 the cover 102 may be secured to a wheel structure in any suitable manner such as, for instance, by the constructions shown in Figures 5 or 6.

I claim as follows:

1. In a vehicle, wheel and wheel cover assembly, said wheel including a flanged tire rim and a central load bearing portion, attachment means on the vehicle for detachably engaging with the central load bearing portion of the wheel, an annular cover disposed over the outer side of the wheel to overlie and conceal said attachment means, means for securing one edge of the cover in the assembly, said cover being formed from a locally, resiliently flexible material and having an edge adapted to be flexed away from the wheel to render the rear side thereof and the attachment means accessible to afford removal of the wheel from the vehicle without requiring removal of the cover therefrom.

2. In a vehicle, wheel and wheel cover assembly, said wheel including a flanged tire rim having an edge portion and a central load bearing portion, attachment means on the vehicle for detachably engaging with the central load bearing portion of the wheel, an annular cover disposed over the outer side of the wheel and having a radial expanse whereby it extends radially from the edge portion of the tire rim radially inwardly to a point on the wheel radially inward of the attachment means, means for securing the cover in the assembly, said cover being formed from a locally resiliently flexible material and having an edge adapted to be flexed away from the wheel to render the rear side thereof and the attachment means accessible to afford removal of the wheel from the vehicle without requiring removal of the cover therefrom.

3. In a vehicle wheel, a tire rim part and a central load bearing part, said central load bearing part including a radially outer portion provided with means for affording attachment of the wheel to a vehicle and a solid central portion constructed to overlie and conceal the end of a spindle of the vehicle to which the wheel is attached and also to serve as a hub cap, means on the central load bearing part between said portions thereof for receiving the inner margin of an annular cover member arranged to complement said solid, central hub cap portion and to overlie and conceal the tire rim and the radially outer portion of the central load bearing part.

4. In a vehicle, wheel and wheel cover assembly, a wheel including a central load bearing portion provided with a radially outer part arranged for detachable engagement with vehicle and a solid, integral central circular hub cap simulating part for overlying and concealing a spindle of a vehicle to which the wheel is attached, means on the central load bearing portion at the radially outer part of said hub cap simulating part for retainingly receiving the radially inner margin of an auxiliary cover member, said cover member comprising an annulus formed from sheet synthetic plastic whereby it is resiliently distortable yet self-sustaining as to form and will snap back into initial configuration when distorting pressures are relieved therefrom and having a cross-sectional configuration whereby it extends with a gradual curvature from the radially outer part of the hub cap part of the central load bearing portion of the wheel out to the radially outward extremity of the wheel, thereby to be resiliently flexible away from the wheel to afford insertion of a wheel removal tool therebehind to the vicinity of the radially outer part of said central load bearing portion.

5. In a wheel structure including a flanged, drop center tire rim and a central load bearing portion, said load bearing portion having a part constructed for retained engagement with a vehicle and having cover retaining means disposed radially inwardly of said first named part, a cover assembly for disposition over said wheel structure including a radially outer annular portion adapted to overlie and conceal the outer side of the flanges of the tire rim in said first named part of the central load bearing portion, said annular portion of the cover being constructed from locally, resiliently flexible, yet form retaining material and having the radially inner part thereof disposed in retained relationship with the retaining means on the wheel.

6. In a wheel structure including a flanged tire rim having a generally axially outwardly extending edge portion, a central load bearing portion comprising a substantially solid, circular disk member, said disk member including a central hub cap simulating part formed convexly, axially outwardly so that the axial outer extremity thereof extends at least to the axially outward extremity of the respective edge portion of the tire rim, cover retaining means at the radially outer confines of the hub cap simulating part and a resiliently flexible annular cover of less durable and different material than said rim and disk member and hub cap simulating portion having the radially inner edge thereof retainingly engaged by said retaining means, said cover extending radially outwardly over the outer side of the wheel to the vicinity of the respective edge portion of the tire rim, thereby to be protected against damage by said edge portion and the hub cap part of the wheel.

7. In a wheel structure and cover assembly, a wheel including a tire rim and a central load bearing portion, said load bearing portion comprising an annulus having an intermediate part constructed to be detachably engaged on a vehicle with which the wheel is associated, said central load bearing portion having the radially inner margin thereof formed to provide a cover retaining lip extending generally axially outwardly with respect to the wheel, and the cover assembly including a radially outer annular part having the radially outer edge terminating in the vicinity of the radially outer extremity of the wheel and extending radially inwardly over the outer side of the wheel and the central load bearing portion thereof so that the radially inner margin thereof is nestingly engaged in said lip on the wheel, said annular part being formed from a plastic, resiliently flexible material whereby it may be manipulated at the outer edge thereof to render the rear side thereof and the wheel attaching means accessible.

8. In a wheel structure and cover assembly, a wheel including a tire rim and a central load bearing portion, said load bearing portion comprising an annulus having an intermediate part constructed to be detachably engaged on a vehicle with which the wheel is associated, and having the radially inner margin thereof formed to provide a cover retaining lip extending generally axially outwardly with respect to the wheel, and the cover assembly including a central circular hub cap simulating part arranged to extend over and conceal the central part of the wheel, said circular part having the radially outer edge thereof constructed to nestingly engage in the lip of the wheel and also including a radially outer annular cover member having the radially inner margin thereof also nestingly engaged within the lip on the wheel and extending radially outwardly to the vicinity of the radially outer extremity of the wheel to overlie and conceal the central load bearing portion of the wheel.

9. In a wheel structure including a tire rim and a central load bearing portion, said load bearing portion including a radially outer part provided with means to facilitate attachment of the wheel to the vehicle and an integral, circular, solid, axially outwardly convex part arranged to house a spindle of a vehicle with which the wheel is associated, a generally axially outwardly, radially outwardly facing groove formed in said central load bearing portion at the radially outer part of the spindle housing part and a cover for the wheel including a radially outer annular flexible portion and an integral, central portion formed to overlie the spindle housing portion of the wheel, said cover being provided at the junction of said annular portion and said central portion with a generally axially inwardly extending circular bead arranged to be disposed in said groove in the central load bearing portion of the wheel to retain the cover thereon so that the outer annular cover portion overlies and conceals the radially outer portion of the central load bearing portion of the wheel.

10. In a vehicle, wheel and wheel cover assembly, a wheel structure comprising a flanged drop center type tire rim having a base flange and an integral central load bearing portion extending radially inwardly of the inner surface of the base flange thereon, a brake drum having a plurality of bolts extending from the radially outer part thereof, apertures in said central load bearing portion for receiving said bolts to maintain the wheel on the drum, protuberances formed on said drum and disposed radially inwardly of said bolts, a central circular hub cap simulating cover member provided at the radially outer margin thereof with means for retainingly engaging over said protuberances to retain said cover member on the wheel and an annular cover member constructed to retainingly engage with said circular cover member and to extend from the vicinity of the protuberances on the brake drum radially outwardly over the outer side of the wheel structure to substantially the radially outer extremity of the wheel, thereby to overlie and conceal appurtenances on the wheel and said bolts.

11. In a vehicle, wheel and wheel cover assembly, a wheel structure comprising a flanged drop center type tire rim having an integral central load bearing portion extending radially inwardly of the inner surface of a base flange thereon, a brake drum having a plurality of bolts extending from the radially outer part thereof, apertures in said central load bearing portion for receiving said bolts to maintain the wheel on the drum, protuberances formed on said drum and disposed radially inwardly of said bolts, a central circular hub cap simulating cover member provided at the radially outer margin thereof with means for retainingly engaging over said protuberances to retain the hub cap cover member on the wheel and an annular cover member constructed to retainingly engage with said circular cover member and to extend from the vicinity of the protuberances on the brake drum radially outwardly over the outer side of the wheel structure to substantially the radially outer extremity of the wheel, thereby to overlie and conceal appurtenances on the wheel and said bolts, said annular cover member being formed from a resiliently flexible plastic material which is self-sustaining as to form and which will snap back to initial configuration when distorting pressures are relieved therefrom, whereby an operator may flex the cover inwardly from the radially outer margin thereof to afford insertion of wheel releasing tool therebehind.

12. In an improved wheel structure, a flanged drop center type tire rim having a base flange and a central load bearing portion formed integrally on and extending radially inwardly from the radially inner surface of a base flange of the tire rim, means on said central load bearing portion for affording attachment of the wheel to a vehicle and a central, circular hub cap simulating portion formed integrally with said central load bearing portion and disposed radially inwardly of said attachment means, and a cover for disposition over the outer side of the wheel structure including an annular, resiliently deflectable cover member having a cross-sectional expanse whereby it may extend from the vicinity of the radially outer part of said hub cap simulating portion of the wheel, radially outwardly to the vicinity of the radially outer extremity of the wheel, means at one edge of said cover for attaching the cover to the wheel, the outer edge of said cover being manually, elastically deflectable outwardly to afford insertion of a wheel removing tool therebehind.

13. In a cover structure for a wheel having an outer side and including a tire rim, a circular cover arranged to extend over the outer side of a wheel to conceal the same, said cover having a radially outer part extending to the vicinity of the radially outer extremity of the wheel and an annular, auxiliary cover arranged for detachable engagement with a flange of the tire rim and having a radially outwardly extending portion adapted to extend beyond the radially outer extremity of the wheel to bridge the junction between the tire rim and a tire therein.

14. In a cover structure for a wheel having an outer side and a tire rim, a deflectable cover member of less durable and different material than the wheel arranged to extend over and conceal the outer side of the wheel and having a radially outer part extending to the radially outer extremity of the wheel and an auxiliary cover member formed from relatively rigid material, said last named cover member including means for attaching the same to a flange of the tire rim and also including a radially outwardly extending portion adapted to extend radially outwardly beyond the radial outer extremity of the wheel to bridge the junction between the tire rim and the tire therein and to protect the radially outer edge of said less durable cover member from damage during operation of a wheel to which the cover assembly is attached.

GEORGE ALBERT LYON.